(12) United States Patent
Whysall et al.

(10) Patent No.: US 6,210,466 B1
(45) Date of Patent: Apr. 3, 2001

(54) VERY LARGE-SCALE PRESSURE SWING ADSORPTION PROCESSES

(75) Inventors: Michael Whysall, Chicago, IL (US); Ludovicus Jan Marie Wagemans, Zoersel (BE)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/371,654

(22) Filed: Aug. 10, 1999

(51) Int. Cl.$^7$ ................................................ B01D 53/047
(52) U.S. Cl. ............................. 95/100; 95/103; 95/105; 95/130; 95/136; 95/137; 95/139; 95/140; 95/143
(58) Field of Search ........................ 95/96–98, 100–105, 95/130, 136, 137, 139, 140, 143

(56) References Cited

U.S. PATENT DOCUMENTS

| | | | |
|---|---|---|---|
| 3,176,444 | | 4/1965 | Kiyonaga ................................. 55/26 |
| 3,430,418 | | 3/1969 | Wagner ..................................... 55/25 |
| 3,564,816 | * | 2/1971 | Batta ....................................... 95/100 |
| 3,636,679 | * | 1/1972 | Batta ....................................... 95/100 |
| 3,703,068 | | 11/1972 | Wagner ..................................... 55/21 |
| 3,738,087 | * | 6/1973 | McCombs ................................ 95/98 |
| 3,986,849 | | 10/1976 | Fuderer et al. ........................... 55/25 |
| 4,077,779 | * | 3/1978 | Sircar et al. ......................... 95/101 X |
| 4,129,424 | * | 12/1978 | Armond ............................. 95/102 X |
| 4,234,322 | * | 11/1980 | De Meyer et al. ................... 95/98 X |
| 4,402,712 | * | 9/1983 | Benkmann ............................... 95/98 |
| 4,468,237 | * | 8/1984 | Fuderer ................................... 95/100 |
| 4,512,780 | * | 4/1985 | Fuderer ................................... 95/100 |
| 4,589,888 | * | 5/1986 | Hiscock et al. ........................ 95/100 |
| 4,650,500 | * | 3/1987 | Patel ....................................... 95/100 |
| 4,650,501 | * | 3/1987 | Hiscock et al. ........................ 95/100 |
| 4,834,780 | * | 5/1989 | Benkmann ............................... 95/98 |
| 4,913,709 | * | 4/1990 | Kumar .................................... 95/100 |
| 5,015,272 | * | 5/1991 | Okada et al. ...................... 95/100 X |
| 5,174,796 | * | 12/1992 | Davis et al. ............................ 95/100 |
| 5,203,888 | * | 4/1993 | Maurer .................................. 95/101 |
| 5,258,059 | * | 11/1993 | Yamaguchi et al. ................... 95/100 |
| 5,354,346 | * | 10/1994 | Kumar .................................... 95/101 |
| 5,547,492 | * | 8/1996 | Cho et al. .............................. 95/100 |
| 6,045,603 | * | 4/2000 | Chen et al. ........................ 95/100 X |

* cited by examiner

Primary Examiner—Robert H. Spitzer
(74) Attorney, Agent, or Firm—John G. Tolomei; Richard P. Silverman

(57) ABSTRACT

According to the present invention, a process is provided which overcomes historical limitations to the capacity of PSA units for a wide variety of gas separations. Capacities in excess of about 110 thousand normal cubic meters per hour (100 million standard cubic feet per day) can now be achieved in a single integrated process train. The corresponding significant equipment reduction results from a departure from the accepted principle in the PSA arts that the length of the purge step must be equal to or less than the length of the adsorption step. Applicants have discovered that by increasing the purge time relative to the adsorption step combined with supplying the purge gas for any adsorption bed in the train from one or more other adsorption beds and during the provide-purge step, the other adsorption beds simultaneously provide the purge gas to essentially all adsorption beds undergoing the purge step, that the single train can provide for significant increases in capacity with a minimum loss in recovery or performance. The benefit of this discovery is that very large-scale PSA units can now be constructed as a single train of equipment for a cost significantly lower than the cost of two or more parallel trains of equipment.

15 Claims, 3 Drawing Sheets

| | | | | | | | | | | | | | | | | | | | | | |
|---|---|---|---|---|---|---|---|---|---|---|---|---|---|---|---|---|---|---|---|---|---|
| 1 | ADSORPTION | | | E1 | E2 | E3 | E4 | PP | DUMP | PURGE | | | | | | | E4 | E3 | E2 | E1 | RP |
| 2 | E1 | RP | ADSORPTION | | | E1 | E2 | E3 | E4 | PP | DUMP | PURGE | | | | | | E4 | E3 | E2 |
| 3 | E3 | E2 | E1 | RP | ADSORPTION | | | E1 | E2 | E3 | E4 | PP | DUMP | PURGE | | | | | | E4 |
| 4 | PU | E4 | E3 | E2 | E1 | RP | ADSORPTION | | | E1 | E2 | E3 | E4 | PP | DUMP | PURGE | | | | |
| 5 | PURGE | | | E4 | E3 | E2 | E1 | RP | ADSORPTION | | | E1 | E2 | E3 | E4 | PP | DUMP | PURGE | | | |
| 6 | PURGE | | | | E4 | E3 | E2 | E1 | RP | ADSORPTION | | | E1 | E2 | E3 | E4 | PP | DUMP | PURGE | | |
| 7 | PURGE | | | | | E4 | E3 | E2 | E1 | RP | ADSORPTION | | | E1 | E2 | E3 | E4 | PP | DUMP | PURGE | |
| 8 | | PURGE | | | | | E4 | E3 | E2 | E1 | RP | ADSORPTION | | | E1 | E2 | E3 | E4 | PP | DUMP | PURGE |
| 9 | DU | | PURGE | | | | | E4 | E3 | E2 | E1 | RP | ADSORPTION | | | E1 | E2 | E3 | E4 | PP | DUMP |
| 10 | PP | DUMP | | PURGE | | | | | E4 | E3 | E2 | E1 | RP | ADSORPTION | | | E1 | E2 | E3 | E4 | PP |
| 11 | PP | | DUMP | | PURGE | | | | | E4 | E3 | E2 | E1 | RP | ADSORPTION | | | E1 | E2 | E3 | E4 |
| 12 | E3 | E4 | PP | | DUMP | | PURGE | | | | | E4 | E3 | E2 | E1 | RP | ADSORPTION | | | E1 | E2 |
| 13 | E1 | E2 | E3 | E4 | PP | | DUMP | | PURGE | | | | | E4 | E3 | E2 | E1 | RP | ADSORPTION | | |
| 14 | ADS | E1 | E2 | E3 | E4 | PP | | DUMP | | PURGE | | | | | E4 | E3 | E2 | E1 | RP | ADSORPTION | |
| 15 | ADSORPTION | | E1 | E2 | E3 | E4 | PP | | DUMP | | PURGE | | | | | E4 | E3 | E2 | E1 | RP | ADSORPTION |
| 16 | ADSORPTION | | | E1 | E2 | E3 | E4 | PP | | DUMP | | PURGE | | | | | E4 | E3 | E2 | E1 | ADS |

FIG. 3

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| 1 | ADSORPTION | | | | | E1 | E2 | E3 | E4 | PP | DUMP | PURGE | | | | | | | | | | | | | | E4 | E3 | E2 | E1 | RP |
| 2 | E1 | RP | ADSORPTION | | | | | | | E1 | E2 | E3 | E4 | PP | DUMP | PURGE | | | | | | | | | | | | E4 | E3 | E2 |
| 3 | E3 | E2 | E1 | RP | ADSORPTION | | | | | | | | E1 | E2 | E3 | E4 | PP | DUMP | PURGE | | | | | | | | | | | E4 |
| 4 | PU | E4 | E3 | E2 | E1 | RP | ADSORPTION | | | | | | | | | E1 | E2 | E3 | E4 | PP | DUMP | PURGE | | | | | | | | |
| 5 | PURGE | | E4 | E3 | E2 | E1 | RP | ADSORPTION | | | | | | | | | | E1 | E2 | E3 | E4 | PP | DUMP | PURGE | | | | | | |
| 6 | PURGE | | | | E4 | E3 | E2 | E1 | RP | ADSORPTION | | | | | | | | | | E1 | E2 | E3 | E4 | PP | DUMP | PURGE | | | | |
| 7 | PURGE | | | | | | E4 | E3 | E2 | E1 | RP | ADSORPTION | | | | | | | | | | E1 | E2 | E3 | E4 | PP | DUMP | PURGE | | |
| 8 | PURGE | | | | | | | | E4 | E3 | E2 | E1 | RP | ADSORPTION | | | | | | | | | | E1 | E2 | E3 | E4 | PP | DUMP | PURGE |
| 9 | | PURGE | | | | | | | | | E4 | E3 | E2 | E1 | RP | ADSORPTION | | | | | | | | | | E1 | E2 | E3 | E4 | PP | DUMP |
| 10 | DU | | PURGE | | | | | | | | | | E4 | E3 | E2 | E1 | RP | ADSORPTION | | | | | | | | | | E1 | E2 | E3 | E4 | PP |
| 11 | PP | DUMP | | PURGE | | | | | | | | | | | E4 | E3 | E2 | E1 | RP | ADSORPTION | | | | | | | | | | E1 | E2 | E4 |
| 12 | E3 | E4 | PP | DUMP | | PURGE | | | | | | | | | | | E4 | E3 | E2 | E1 | RP | ADSORPTION | | | | | | | | | E1 |
| 13 | E1 | E2 | E3 | E4 | PP | DUMP | | PURGE | | | | | | | | | | | E4 | E3 | E2 | E1 | RP | ADSORPTION | | | | | | | |
| 14 | ADS | | E1 | E2 | E3 | E4 | PP | DUMP | | PURGE | | | | | | | | | | | E4 | E3 | E2 | E1 | RP | ADSORPTION | | | | | |
| 15 | ADS | | | | E1 | E2 | E3 | E4 | PP | DUMP | | PURGE | | | | | | | | | | | E4 | E3 | E2 | E1 | RP | ADSORPTION | | | |
| 16 | ADS | | | | | | E1 | E2 | E3 | E4 | PP | DUMP | | PURGE | | | | | | | | | | | E4 | E3 | E2 | E1 | RP | ADS | |

VERY LARGE-SCALE PRESSURE SWING ADSORPTION PROCESSES

FIELD OF THE INVENTION

The present invention relates to processes for the separation of gases using pressure swing adsorption (PSA). More particularly, the present invention relates to the use of a particular combination of PSA steps in a particular manner to significantly expand the capacity of the separation process.

BACKGROUND OF THE INVENTION

PSA provides an efficient and economical means for separating a multi-component gas stream containing at least two gases having different adsorption characteristics. The more strongly adsorbable gas can be an impurity which is removed from the less strongly adsorbable gas which is taken off as product or the more strongly adsorbable gas can be the desired product which is separated from the less strongly adsorbable gas. For example, it may be desired to remove carbon monoxide and light hydrocarbons from a hydrogen-containing feed stream to produce a purified (99+ percent) hydrogen stream for a hydrocracking or other catalytic process where these impurities could adversely affect the catalyst or the reaction. On the other hand, it may be desired to recover more strongly adsorbable gases, such as ethylene, from a feedstream to produce an ethylene-rich product.

In PSA, a multi-component gas is typically fed to at least one of a plurality of adsorption zones at an elevated pressure effective to adsorb at least one component, while at least one other component passes through. At a defined time, the feedstream to the adsorber is terminated and the adsorption zone is depressurized by one or more countercurrent depressurization steps wherein pressure is reduced to a defined level which permits the separated, less strongly adsorbed component or components remaining in the adsorption zone to be drawn off without significant concentration of the more strongly adsorbed components. Then, the adsorption zone is depressurized by a countercurrent depressurization step wherein the pressure on the adsorption zone is further reduced by withdrawing desorbed gas countercurrently to the direction of the feedstream. Finally, the adsorption zone is purged with the effluent from an adsorption bed undergoing a countercurrent depressurization step and repressurized. The final stage of repressurization is typically with product gas and is often referred to as product repressurization. In multi-zone systems, there are typically additional steps and those noted above may be done in stages. U.S. Pat. No. 3,176,444 (Kiyonaga), U.S. Pat. No. 3,986,849 (Fuderer et al.) and U.S. Pat. Nos. 3,430,418 and 3,703,068 (both issued to Wagner), among others, describe multi-zone, adiabatic PSA systems employing both countercurrent and countercurrent depressurization and the disclosures of these patents are incorporated by reference in their entireties. The above-mentioned patents to Fuderer et al. and Wagner are herein incorporated by reference.

Various classes of adsorbents are known to be suitable for use in PSA systems, the selection of which is dependent upon the feedstream components and other factors generally known to those skilled in the art. In general, suitable adsorbents include molecular sieves, silica gel, activated carbon, and activated alumina. For some separations, specialized adsorbents can be advantageous. PSA generally employs weak adsorbents and is used for separations wherein the amount of the component to be separated can range from traces to greater than 95 mole percent. PSA systems are preferred when high concentrations of valuable feedstock, products, or reusable solvents are to be recovered. A PSA cycle is one in which the desorption takes place at a pressure much lower than adsorption. In some applications, the desorption takes place under vacuum conditions—vacuum swing adsorption (VSA). To overcome the inherent low operating loadings on the weak adsorbent, PSA cycles generally have cycle times that are short—on the order of seconds to minutes—to maintain reasonably sized adsorbent beds.

One of the problems of building modern gas processing facilities is that the size of the facility or the amount of gas to be treated in any one facility is continuing to increase. Capacities of modern gas processing complexes are generally greater than about 110 thousand normal cubic meters per hour (100 million standard cubic feet per day). Most PSA vessels are limited to a diameter which can be transported to a construction site which generally limits the vessels to a diameter of about 4 meters (about 13 feet) and the height of the vessel is limited by the crush strength of the adsorbent particle. For capacities greater than about 110 thousand normal cubic meters per hour (100 million standard cubic feet per day), PSA processes are provided in multiple trains of duplicate equipment such as pumps, heaters, lines, valves, vessels, and compressors.

It is an objective of the present invention to provide a PSA process for very large gas processing units in a single train of equipment.

It is an objective of the present invention to provide a process sequence which overcomes the physical limitations of vessel size and adsorbent strength to permit the processing of large amounts of feed without giving up overall performance of large-scale gas separation systems.

SUMMARY OF THE INVENTION

According to the present invention, a process is provided which overcomes historical limitations to the capacity of PSA units for a wide variety of gas separations. Capacities in excess of about 110 thousand normal cubic meters per hour (100 million standard cubic feet per day) can now be achieved in a single integrated process train. This equipment reduction is enabled by a departure from the accepted principle in the PSA arts that the length of the purge step must be equal to or less than the length of the adsorption step. Applicants have discovered that increasing the purge time relative to the adsorption step can provide for significant increases in capacity with a minimum loss in recovery or performance. The benefit of this discovery is that very large-scale PSA units can now be constructed for a cost significantly lower than the cost of a second parallel train of equipment.

In one embodiment, the present invention is a process for the separation of a non-adsorbable gas from a gas mixture comprising the non-adsorbable gas and an adsorbable gas in a single train PSA zone. The process comprises passing the gas mixture to the single train PSA zone and withdrawing a product gas stream comprising the non-adsorbable gas and a waste gas stream comprising the adsorbable gas. The single train PSA zone has a plurality of adsorption beds wherein each adsorption bed employs an adsorption step, at least three countercurrent equalization steps including a final countercurrent equalization step, a provide-purge step, a countercurrent blow down step, a purge step, at least three countercurrent equalization steps including a final countercurrent equalization step and a repressurization step. Each of the process steps occurs in a sequential manner and are offset in time such that the adsorption step occurs over an adsorption step time, the provide-purge step occurs over a provide-purge step time and a purge step occurs over a purge step time. The purge step time is greater than the adsorption step time, wherein the purge step comprises a step wherein the adsorption bed which is undergoing a purge step is receiving a purge gas from one or more other adsorption beds which are undergoing the provide-purge step and wherein these other adsorption beds are simultaneously providing the purge gas to the adsorption bed undergoing the purge step. At any time, the number of adsorption beds undergoing the adsorption step is exceeded by the number of adsorption beds undergoing the purge step.

In another embodiment, the present invention is a process for the separation of hydrogen from a gas mixture comprising hydrogen, carbon dioxide, and nitrogen in a multiple adsorption bed PSA zone in a single adsorption train. The process comprises passing the gas mixture to the multiple adsorption bed PSA zone and withdrawing a hydrogen product and a waste gas stream. The multiple adsorption bed PSA zone has a plurality of adsorption beds wherein in each adsorption bed the following steps are employed: an adsorption step, at least three countercurrent equalization steps, a provide-purge step, a countercurrent blow down step, a purge step, at least three countercurrent equalization steps, and a repressurization step. Each of the steps occurs in a sequential manner and is offset in time. The adsorption step occurs over an adsorption step time, the provide-purge step occurs over a provide-purge step time and a purge step occurs over a purge step time. The purge step time is greater than the adsorption step time, wherein the purge step comprises the adsorption bed undergoing a purge step receiving a purge gas from one or more other adsorption beds during a provide-purge step and wherein these other adsorption beds are simultaneously providing the purge gas to essentially all adsorption beds undergoing the purge step. At any time the number of adsorption beds undergoing the adsorption step is exceeded by the number of adsorption beds undergoing the purge step.

In a still further embodiment, the present invention is a process for the separation of a non-adsorbable gas from a gas mixture comprising the non-adsorbable gas and an adsorbable gas in a multiple adsorption bed PSA zone. The process comprises the following steps. The gas mixture at an adsorption pressure is passed to a first adsorption bed of a plurality of adsorption beds in the PSA zone. Each of the adsorption beds contains an adsorbent selective for the adsorption of the adsorbable gas in an adsorption step over an adsorption step time and an adsorption effluent stream is recovered therefrom. The first adsorption zone is countercurrently depressurizing in equalization steps with other adsorption beds wherein each of the other adsorption beds have a sequentially lower equalization pressure. The countercurrent depressurization step is repeated at least three times to reach a last equalization step. The first adsorption bed is further countercurrently depressurized to provide a desorption effluent stream in a provide-purge step over a provide-purge time and simultaneously the desorption effluent stream is passed to at least two other adsorption beds which are undergoing the purge step. The first adsorption bed is countercurrently depressurized to a blow down pressure and a waste stream is recovered at a desorption pressure. The first adsorption bed is purged with a purge stream for a purge step time wherein the purge step time is greater than the adsorption step time. The purge stream is passed from one or more adsorption beds undergoing a countercurrent provide-purge step or undergoing a countercurrent equalization step. The first adsorption bed is countercurrently repressurized by equalizing the pressure in the first adsorption bed with other adsorption beds wherein each of the other adsorption beds have a sequentially higher equalization pressure and this countercurrent repressurization step is repeated at least three times. The first adsorption bed is a countercurrently repressurized bed with a portion of the adsorption effluent stream and the above process steps are repeated to provide a continuous process.

BRIEF DESCRIPTION OF THE DRAWINGS

FIG. 1 is a simplified cycle chart illustrating a conventional 16-bed PSA separation system of the prior art.

FIG. 2 is a simplified cycle chart illustrating the novel PSA cycle for a 16-bed system of the present invention.

FIG. 3 is a simplified cycle chart illustrating a variation of the novel PSA cycle for a 16-bed system of the present invention.

DETAILED DESCRIPTION OF THE INVENTION

The feed to the process of the current invention can include hydrogen, carbon monoxide, carbon dioxide, nitrogen, inert gases, and hydrocarbons. The process of the current invention can be used to separate hydrogen from adsorbable compounds such as carbon monoxide, carbon dioxide, nitrogen, and hydrocarbons or the process can be used to separate methane from less adsorbable compounds including carbon dioxide, sulfur oxides, hydrogen sulfide, heavier hydrocarbons, and mixtures thereof. By the term "hydrocarbons", it is meant hydrocarbons having from 1 to 8 carbon atoms per molecule including, alkanes, alkenes, cycloalkenes, and aromatic hydrocarbons such as benzene. By the term "a single train of equipment", it is meant a succession of process equipment including pumps, heaters, vessels, valves, lines, and compressors which are assembled to perform a specific task such as gas separation which does not contain a complete duplication of equipment. A single train is contrasted with a multiple train process which comprises a series of parallel, identical successions of such process equipment assembled to perform a single task. Generally, multiple trains of process equipment are employed when some physical limit of one or more components of the succession of a single train of process equipment has been exceeded.

In accordance with the present invention, the adsorption pressure is generally from about 350 kPa to about 7 MPa (50 to 1000 psia) and preferably from about 700 kPa to about 3.5 MPa (100 to 510 psia). The desorption pressure is preferably from about 3 to 550 kPa (0.5 to 80 psia) and more preferably the desorption pressure ranges from about 3 to about 210 kPa (0.5 to 30 psia). Suitable operating temperatures are generally within the range of from about 10° to 65° C. (50° to 150° F.). There can be a variety of countercurrent depressurization steps to intermediate pressures, countercurrent purging steps, and countercurrent purging steps, all of which are well known to those skilled in the art and described in the previously cited patents relating to PSA processes. For example, one to five or more of such countercurrent depressurization steps can be employed for pressure equalization to further improve product recovery such as disclosed in the above-identified U.S. Pat. No. 3,986,849 (Fuderer et al.). Other details of the PSA process are described in U.S. Pat. No. 3,986,849 (Fuderer et al.), the four adsorption zone systems described in U.S. Pat. No. 3,430,418 (Wagner) and U.S. Pat. No. 3,564,816 (Batta), the three adsorption zone systems described in U.S. Pat. No. 3,636,679 (Batta) and the two adsorption zone systems described in U.S. Pat. No. 3,738,087 (McCombs), the disclosures of which are hereby incorporated by reference The PSA process of the present invention is of the general PSA type. The feedstream is introduced to an adsorbent bed undergoing adsorption at the highest pressure, or the adsorption pressure, to an inlet end of an adsorbent bed having the inlet end and a discharge end opposite.

The adsorbent may comprise powdered solid, crystalline compounds capable of adsorbing and desorbing the adsorbable compound. Examples of such adsorbents include silica gels, activated aluminas, activated carbon, molecular sieves, and mixtures thereof. Molecular sieves include zeolite molecular sieves. The preferred adsorbents are zeolites.

U.S. Pat. No. 3,986,849 (Fuderer et al.) describes various cycles using for example an adsorption time of 240 seconds in a 10-adsorbent bed configuration with a total cycle time of 13 minutes, 20 seconds. By increasing the number of beds, the total adsorption time can be reduced. For example, for the same adsorption time of 240 seconds in a 10 12-adsorbent bed configuration, the total cycle time may be reduced to 12 minutes. When the same adsorbent volume is used for the 10- and the 12-adsorbent bed configurations and provided the same relative adsorbent inventory per unit volume of feed is required, this would result in an increased product capacity of about 33 percent. Similarly, for the same adsorption time of 240 seconds in a 14-adsorbent bed configuration, the total cycle time would be reduced to 11 minutes, 12 seconds and an increase in product capacity relative to the 10-adsorbent bed configuration of 66 percent. The same analysis can be applied to configurations with any number of adsorbers, odd or even. In general, holding the adsorption time constant reduces the total cycle time and increases the capacity. As more adsorbent beds are operating on the adsorption step which corresponds to higher feed rates, the sub-cycle time, defined as the total cycle time divided by the number of adsorbent beds, decreases which has the effect of reducing the time available for the other steps in the cycle. Contrary to previous art, it has been found that reducing the time for receiving purge has a more significant impact in reducing the recovery of the unadsorbed product effluent and also increasing the relative volume of adsorbent required, compared to reducing the time for the adsorption step. Also, all of the previously described cycles have a lower number of adsorbent beds on the purge step than on the adsorption step. With the exception of PSA cycles which employ external tanks, all of the prior art PSA processes require the same number of adsorbent beds on the provide-purge step as on the receiving purge step, or purge step.

The process of the present invention will hereinafter be described with reference to the Figures.

Figure 1:
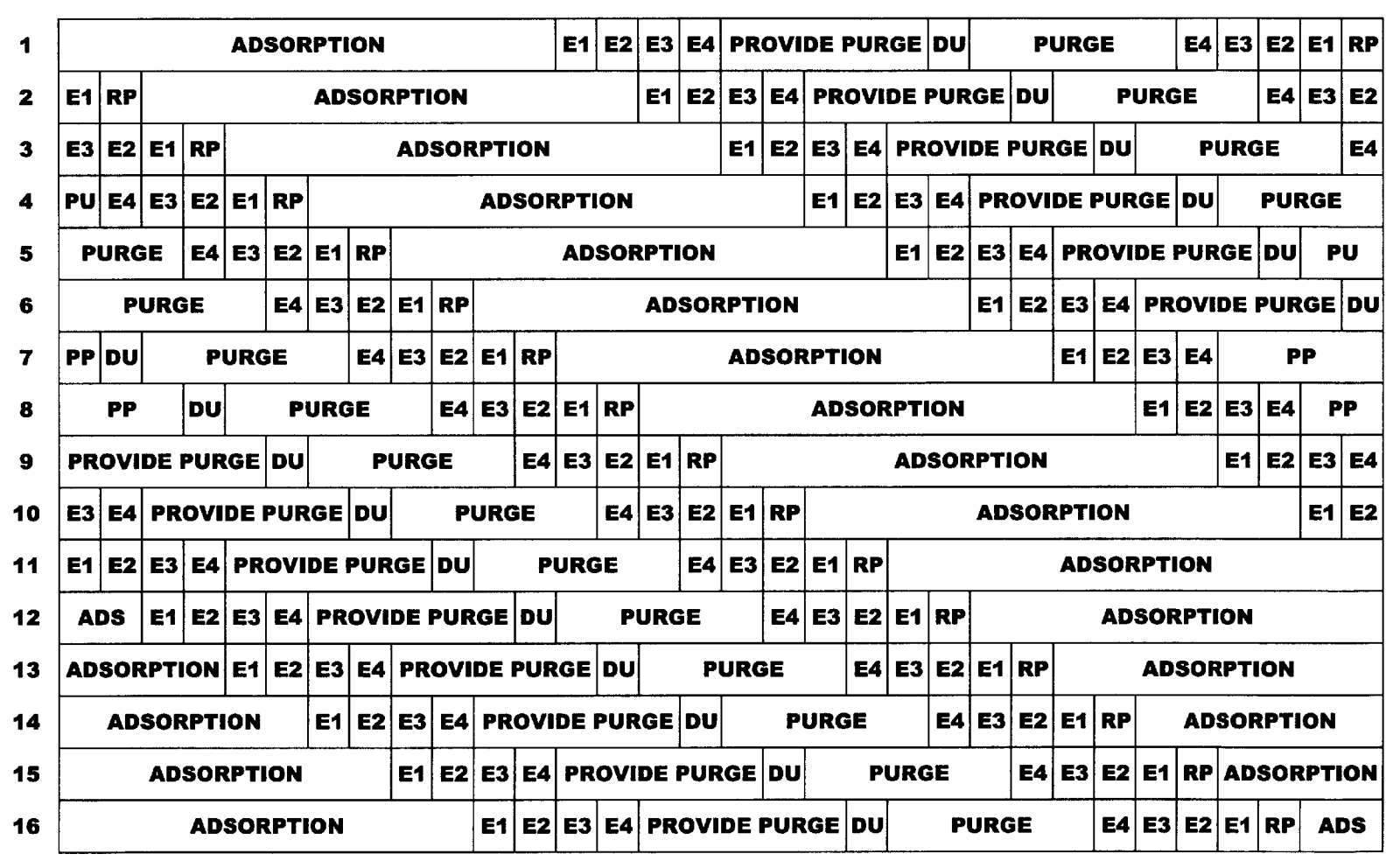

Referring to FIG. 1, a process cycle representation is presented for a conventional PSA system with 16 adsorbent beds. The cycle for each adsorbent bed consists of an adsorption step, four countercurrent depressurization steps, a coutercurrent provide-purge step, a countercurrent blow down step, a purge step, four countercurrent repressurization steps, and a final repressurization step. Within this conventional 16-bed cycle at any time, six adsorbent beds are operating in an adsorption step, three adsorbent beds are operating in a purge step and three adsorbent beds are operating in a provide-purge step. The purge gas for any adsorption bed is directly provided from another adsorption bed. That is, the number of adsorption beds providing purge and the number of adsorption beds receiving purge gas, or undergoing the purge step, are the same. For any adsorbent bed in the cycle, the time for the purge step, or purge step time, is equal to the time for the provide-purge step, or provide-purge time. In addition, the time over which the adsorption step occurs, or the adsorption step time, is longer than either the provide-purge step or the purge step.

Referring to FIG. 2, a process cycle representative of the present invention is illustrated for 16 adsorbent beds operating in a single train. The cycle depicted in FIG. 2 contains the same steps as shown in FIG. 1 but differs in that there are only four adsorption steps, five purge steps and purge gas is supplied to more than one adsorption bed at any time in the cycle. Furthermore, the purge time is significantly longer than the adsorption time for any bed in the cycle. Referring to FIG. 2, following the adsorption step, adsorption bed 1 undergoes four countercurrent depressurization or equalization steps. During the first equalization step, adsorption bed 1 is countercurrently linked with adsorption bed 6. During the next equalization step, adsorption bed 1 is linked to adsorption bed 7. During the third equalization step, adsorption bed 1 is linked to adsorption bed 8 and during the last or fourth equalization step, adsorption bed 1 is linked to adsorption bed 9. Adsorption bed 1 then undergoes a provide-purge step wherein the adsorption bed is co-currently depressurized and a purge gas is withdrawn from adsorption bed 1 and passed to adsorption beds 10, 11, 12, 13, and 14 to provide purge gas for purging essentially all of those beds during a first portion of the provide-purge step. In this example, at the same time, adsorption bed 16 is also undergoing countercurrent depressurization and providing a purge gas to adsorption beds 10, 11, 12, 13, and 14. In the next portion of the provide-purge step, purge gas is provided to adsorption beds 11, 12, 13, 14, and 15 and in the final segment of the provide-purge step, purge gas is supplied to beds 11, 12, 13, 14, and 15. At the same time, adsorption bed 2 is also undergoing countercurrent depressurization and providing a purge gas to the same adsorption beds 11, 12, 13, 14, and 15. The countercurrent blow down step follows the provide-purge step. In the countercurrent blow down step, the adsorption bed is depressurized countercurrently to release a waste gas stream. The first adsorption bed is then purged countercurrently with purge gas initially from adsorption bed 3, then adsorption beds 3 and 4, then adsorption bed 4, then adsorption beds 4 and 5, then adsorption bed 5, then adsorption beds 5 and 6, then adsorption bed 6, then adsorption beds 6 and 7, then adsorption bed 7, and finally from adsorption beds 7 and 8. During the initial phase of the countercurrent purge of adsorption bed 1, adsorption bed 2 is undergoing countercurrent blow down to waste pressure. Adsorption bed 3 is undergoing a countercurrent provide-purge step, adsorption bed 4 is undergoing the fourth co-current equalization step with adsorption bed 12, adsorption bed 5 is undergoing the second countercurrent equalization step with adsorption bed 11, adsorption beds 6, 7, 8, and 9 are on the adsorption step, adsorption bed 10 is undergoing final repressurization, adsorption bed 11 is undergoing second countercurrent equalization with adsorption bed 5, adsorption bed 12 is undergoing countercurrent equalization with adsorption bed 11, and adsorption beds 13, 14, 15, and 16 are also undergoing countercurrent purge. In this manner, purge gas is supplied from one or more adsorption beds to at least two other beds undergoing a purge step. At the end of the last equalization step, adsorption bed 1 is repressurized with the adsorption pressure. Repressurization can be accomplished by reintroducing feed or by countercurrently introducing a portion of the product stream.

Referring to FIG. 3, a process cycle of the present invention in an alternative embodiment for a 16-bed cycle is represented. In the 16-bed cycle in FIG. 3, there are four adsorption steps and six purge steps. In this configuration, the countercurrent provide purge is taken for part of the step simultaneously with the last countercurrent equalization and for part of the step separately. The countercurrent provide purge is taken from one adsorption bed and is passed to six adsorption beds simultaneously.

The following examples are provided for illustrative purposes and are not intended to limit the scope of the claims that follow.

EXAMPLES

Example I

Table 1 illustrates a conventional PSA cycle according to U.S. Pat. No. 3,986,849 (Fuderer et al.) for a cycle employing 12 adsorption beds. In the conventional cycle, the adsorption step time and the depressurization step time are equal and each represents approximately one-third of the total cycle time. Receiving purge gas represents 13 percent of the cycle and repressurization represents approximately 21 percent of the total cycle. Similarly, for a conventional 16-bed cycle of the prior art as shown in FIG. 1, the distribution of the steps within the cycle are shown in Table 1 in the 16-bed cycle. Adsorption time now accounts for approximately 37.5 percent of the cycle, depressurization amounts to about 31.3 percent of the total cycle, receiving purge gas amounts to about 15.6 percent of the cycle, and repressurization amounts to about 15.6 percent of the cycle. At high feed rates, the volume of the adsorbent bed reaches the maximum practical size beyond which it is necessary to reduce the adsorption time and correspondingly the total cycle time. This has the desirable effect of reducing the specific adsorbent inventory but has the undesirable effect of reducing the time for receiving purge. Reducing the receiving purge time significantly reduces the recovery of the unadsorbed product effluent and increases the relative volume of adsorbent required per volume of feed. Thus, the expected increase in product capacity is not reached and in fact it is doubly penalized. The recovery of the unadsorbed product effluent is reduced and relative volume of adsorbent required per volume of feed is increased.

TABLE 1

Distribution of PSA Process Steps, %

| Process Step | 12-Bed Cycle | 16-Bed Cycle |
| --- | --- | --- |
| Adsorption | 33.0 | 37.5 |
| Depressurization | 33.0 | 31.3 |
| Receive Purge | 13.0 | 15.6 |
| Repressurization | 21.0 | 15.6 |
| Total Cycle | 100.0 | 100.0 |

Example II

Table 2 illustrates a PSA cycle of the present invention for a 16-bed cycle as shown in FIG. 2. According to the present invention, the time on the receiving purge step is increased and the provide-purge step is de-coupled from the receive purge step. The adsorption step now amounts to approximately 25 percent of the total cycle, the depressurization steps amount to approximately 28.1 percent of the total cycle, the receive purge steps account for approximately 31.3 percent of the total cycle, and the repressurization steps remain at 15.6 percent of the cycle. Although there is less than about a 0.1 percent reduction in the recovery of the unadsorbed product effluent, there is no increase in the requirement for the relative volume of adsorbent per volume of feed and the total cycle time is reduced, translating into an overall increase in the capacity. A further advantage of this type of cycle is that there are more adsorbers on the countercurrent depressurization step and purge step, these steps are discharging gas to the low pressure, and the composition leaving the adsorber varies with time. Having more adsorbers on the step provides for much improved mixing of these gases before the mixing (or surge) drum. This can significantly reduce the volume required for mixing and hence the cost of this drum as well as providing for much better control of the low pressure gas.

TABLE 2

Distribution of New PSA Process Steps, %

| Process Step | 16-Bed Cycle |
| --- | --- |
| Adsorption | 25.0 |
| Depressurization | 28.1 |
| Receive Purge | 31.3 |
| Repressurization | 15.6 |
| Total Cycle | 100.0 |

Example III

A pilot plant was used for the evaluation of the effect of changing the purge time relative to the adsorption time in PSA cycles. The pilot plant consisted of a single adsorbent chamber containing about 340 cc of adsorbent along with the ancillary vessels, valves, and connecting piping required to simulate multi-bed PSA cycles. The feed included about 72.5 mole percent hydrogen, 0.67 mole percent nitrogen, 2.04 mole percent carbon monoxide, 5.57 mole percent methane, and about 19.2 mole percent carbon dioxide. The adsorbent comprised activated carbon and a zeolite molecular sieve to produce a product hydrogen which comprised less than about 1 ppm carbon monoxide and about 1 ppm methane. The chamber was operated in a cyclic adsorption and desorption sequence over a range of operating pressures from about 2200 kPa (320 psia) to about 160 kPa (23 psia). The purge pressure was about 160 kPa (23 psia), the last equalization pressure was about 614 kPa (89 psia), and the provide-purge pressure was about 255 kPa (37 psia). The bed was repressurized with product gas at a product pressure of about 2140 kPa (310 psia). The feed temperature was maintained at the ambient temperature which averaged about 21° C. (70° F.). The temperature of the adsorbent chamber was essentially the same as the feed temperature or within about 6° C. of the feed temperature with surprisingly little variation during the adsorption time in the cycle. The PSA cycle time employed for the field tests comprised an adsorption time which ranged from about 90 seconds to about 180 seconds. The equalization time and the blow down step times were about 30 seconds and the provide-purge step time was about 60 seconds. The performance in terms of hydrogen recovery and capacity in terms of feed per cycle was measured as shown in Table 3.

TABLE 3

| PSA Performance | | | |
|---|---|---|---|
| Adsorption Time, seconds | 180 | 180 | 90 |
| Purge Time, seconds | 90 | 45 | 90 |
| H$_2$ Recovery, % | 87.4 | 85.9 | 87.2 |
| Capacity | 100 | 91 | 100 |

These results clearly show that reducing the adsorption step time by a ratio of about 2 (from 180 seconds to 90 seconds) results in a change in the hydrogen recovery of about 0.2 percent while a change in the purge step time by a similar ratio (from 90 to 45 seconds) results in a change in hydrogen recovery of about 1.5 percent. Thus, the effect of reducing the purge step time is 8 to 10 times more significant than reducing the adsorption step time. In a PSA process, the total cycle time has a direct relationship to the cost of the equipment. The shorter the total cycle time, the lower the cost. As supported by the above results, the total cycle time can be shortened with minimal effect on the overall recovery by increasing the purge step time relative to the adsorption step time.

Example IV

The pilot plant and procedure described in Example III was used to evaluate the effect on product recovery and cycle time for reducing the adsorption step time relative to the provide-purge step time. Table 4 summarizes the results for a hydrogen feed containing about 99 mole percent hydrogen and 1 mole percent carbon monoxide. The adsorbent employed for the separation was a molecular sieve of the 5A type and the adsorption took place at about 21° C. (70° F.). The PSA process comprised three equalization steps.

TABLE 4

| PSA Performance | | |
|---|---|---|
| Adsorption Time, seconds | 180 | 60 |
| Purge Time, seconds | 90 | 90 |
| H$_2$ Recovery, % | 89.4 | 89.2 |
| Capacity | 100 | 96 |

The first column in Table 4 shows the hydrogen recovery for a 180-second adsorption step time in a conventional PSA cycle with a 12-minute total cycle time wherein the ratio of the purge step time to the adsorption step time was about 0.5. In the second column, the results of a cycle of the present invention are shown wherein the ratio of the purge step time to the adsorption step time is increased to about 1.5 and the total cycle time is reduced to 10 minutes. The results of Example IV show that for a 20 percent decrease in the cycle time by decreasing the adsorption step time relative to the purge step time, the hydrogen recovery is only reduced slightly.

We claim:

1. A process for the separation of a non-adsorbable gas from a gas mixture comprising the non-adsorbable gas and an adsorbable gas in a single train pressure swing adsorption zone, the process comprising passing the gas mixture to the single train pressure swing adsorption zone and withdrawing a product gas stream comprising the non-adsorbable gas and a waste gas stream comprising the adsorbable gas, said single train pressure swing adsorption zone having a plurality of adsorption beds employing in each adsorption bed an adsorption step, at least three cocurrent equalization steps including a final cocurrent equalization step, a provide-purge step, a countercurrent blow down step, a purge step, at least three countercurrent equalization steps including a final countercurrent equalization step and a repressurization step, each of said steps occurring in a sequential manner and offset in time wherein the adsorption step occurs over an adsorption step time, the provide-purge step occurs over a provide-purge step time and a purge step occurs over a purge step time, the purge step time being greater than the adsorption step time and wherein said purge step comprises the adsorption bed undergoing a purge step receiving a purge gas from one or more other adsorption beds undergoing the provide-purge step wherein said other adsorption beds are simultaneously providing the purge gas to the adsorption bed undergoing the purge step and wherein at any time the number of adsorption beds undergoing the adsorption step is exceeded by the number of adsorption beds undergoing the purge step.

2. The process of claim 1 wherein a ratio of the purge step time to the adsorption step time comprises greater than about 1.0 and less than about 2.0.

3. The process of claim 1 wherein the gas mixture is passed to the single train pressure swing adsorption zone at a feed rate greater than about 110 thousand normal cubic meters per hour (100 million standard cubic feet per day).

4. The process of claim 1 wherein the single train pressure swing adsorption zone comprises from about 10 to about 20 adsorption beds.

5. The process of claim 1 wherein the single train pressure swing adsorption zone comprises a single train of at least about 10 adsorption beds.

6. The process of claim 1 wherein the single train pressure swing adsorption zone comprises a single train of about 16 adsorption beds, wherein the process comprises at least four adsorption steps, at least five purge steps, and the purge step time exceeds the adsorption step time by a ratio of about 1.25 times the adsorption step time.

7. The process of claim 1 wherein the purge step time exceeds the adsorption step time by a ratio of between about 1.25 and about 1.50 times the adsorption step time.

8. The process of claim 1 wherein a portion of the purge gas is provided by an adsorption bed undergoing the final cocurrent equalization step.

9. The process of claim 1 wherein the provide-purge step occurs over the provide-purge step time and the provide-purge time is less than the purge time, said provide-purge step time comprising between about 0.15 and about 0.4 times the purge step time.

10. The process of claim 1 wherein the non-adsorbable component comprises hydrogen and the adsorbable component is selected from the group consisting of hydrocarbons, carbon dioxide, carbon monoxide, nitrogen, and mixtures thereof.

11. The process of claim 1 wherein the non-adsorbable component comprises methane and the adsorbable component is selected from the group consisting of carbon dioxide, hydrocarbons with more than one carbon atom, sulfur oxides, hydrogen sulfide, and mixtures thereof.

12. A process for the separation of hydrogen from a gas mixture comprising hydrogen, carbon dioxide, and nitrogen in a multiple adsorption bed pressure swing adsorption zone in a single adsorption train, the process comprising passing the gas mixture to the multiple adsorption bed pressure swing adsorption zone and withdrawing a hydrogen product and a waste gas stream, said multiple adsorption bed pressure swing adsorption zone having a plurality of adsorption beds employing in each adsorption bed an adsorption step, at least three cocurrent equalization steps, a provide-purge step, a countercurrent blow down step, a purge step, at least three countercurrent equalization steps, and a repressurization step, each of said steps occurring in a sequential manner and offset in time wherein the adsorption step occurs over an adsorption step time, the provide-purge step occurs over a provide-purge step time and the purge step occurs over a purge step time, the purge step time being greater than the adsorption step time and wherein said purge step comprises the adsorption bed receiving a purge gas from one or more other adsorption beds during a provide-purge step wherein said other adsorption beds simultaneously provide the purge gas to essentially all adsorption beds undergoing the purge step and wherein at any time the number of adsorption beds undergoing the adsorption step is exceeded by the number of adsorption beds undergoing the purge step.

13. A process for the separation of a non-adsorbable gas from a gas mixture comprising the non-adsorbable gas and an adsorbable gas in a multiple adsorption bed pressure swing adsorption zone, the process comprising:

a) passing the gas mixture at an adsorption pressure to a first adsorption bed of a plurality of adsorption beds in said pressure swing adsorption zone, each of said adsorption beds containing an adsorbent selective for the adsorption of the adsorbable gas in an adsorption step for an adsorption step time and recovering an adsorption effluent stream;

b) cocurrently depressurizing the first adsorption zone in equalization steps with other adsorption beds, each of the other adsorption beds having sequentially lower equalization pressure and repeating this cocurrent depressurization step at least three times to a last equalization step;

c) further cocurrently depressurizing the first adsorption bed to provide a desorption effluent stream in a provide-purge step over a provide-purge time and simultaneously passing the desorption effluent stream to at least two other adsorption beds undergoing the purge step;

d) countercurrently depressurizing the first adsorption bed to a blow down pressure and recovering a waste stream at a desorption pressure;

e) purging the first adsorption bed with a purge stream for a purge step time wherein the purge step time is greater than the adsorption step time, said purge stream being passed from one or more adsorption beds undergoing a cocurrent provide-purge step or undergoing a cocurrent equalization step;

f) countercurrently repressurizing the first adsorption bed by equalizing the pressure in the first adsorption bed with other adsorption beds, each of the other adsorption beds having a sequentially higher equalization pressure and repeating this countercurrent repressurization step at least three times;

g) countercurrently repressurizing the first adsorption bed with a portion of the adsorption effluent stream; and, h) repeating steps (a) through (g) to provide a continuous process.

14. The process of claim 13 wherein the gas mixture is passed to the multiple adsorption bed pressure swing adsorption zone at a capacity of greater than about 110 thousand normal cubic meters per hour (100 million standard cubic feet per day).

15. The process of claim 13 wherein the multiple adsorption bed pressure swing adsorption zone comprises at least ten adsorption beds.

* * * * *